United States Patent
Williamson et al.

(10) Patent No.: US 6,616,246 B1
(45) Date of Patent: Sep. 9, 2003

(54) HYDRAULIC BRAKING SYSTEMS FOR VEHICLES

(75) Inventors: Michael Williamson, Gwent (GB); Mark Batchelor, Gwent (GB)

(73) Assignee: Arvin Meritor, Inc., Troy, MI (US)

( * ) Notice: Subject to any disclaimer, the term of this patent is extended or adjusted under 35 U.S.C. 154(b) by 0 days.

(21) Appl. No.: 09/787,991

(22) PCT Filed: Sep. 24, 1999

(86) PCT No.: PCT/GB99/03203

§ 371 (c)(1),
(2), (4) Date: Jun. 11, 2001

(87) PCT Pub. No.: WO00/18626

PCT Pub. Date: Apr. 6, 2000

(30) Foreign Application Priority Data

Sep. 26, 1998 (GB) .............................. 9820911

(51) Int. Cl.[7] .............................. B60T 11/20
(52) U.S. Cl. .................. 303/9.62; 303/9.61; 303/113.4; 188/345
(58) Field of Search .............................. 303/9.61, 9.62, 303/113.4; 188/345

(56) References Cited

U.S. PATENT DOCUMENTS

| | | | | |
|---|---|---|---|---|
| 3,640,067 A | * | 2/1972 | Ingram | 188/358 |
| 3,749,451 A | * | 7/1973 | Edsall | 303/9.61 |
| 4,547,967 A | * | 10/1985 | Reynolds et al. | 303/7 |
| 5,971,499 A | * | 10/1999 | Pape et al. | 303/9.61 |
| 6,089,678 A | * | 7/2000 | Mortimer | 303/113.4 |

FOREIGN PATENT DOCUMENTS

| | | |
|---|---|---|
| GB | 2 179 108 A | 2/1987 |
| GB | 2 179 715 A | 3/1987 |

* cited by examiner

Primary Examiner—Matthew C. Graham
(74) Attorney, Agent, or Firm—Carlson, Gaskey & Olds

(57) ABSTRACT

In an hydraulic braking system for vehicles a pedal-operated booster-assisted hydraulic master cylinder assembly (1) is adapted to apply a vehicle brake (2) by the supply of hydraulic fluid under pressure to a brake actuator for operating the brake, and a proportional valve (50) is arranged to provide a quick-fill function for the brake actuator in response to a proportional pilot signal (40) from the master cylinder assembly.

8 Claims, 2 Drawing Sheets

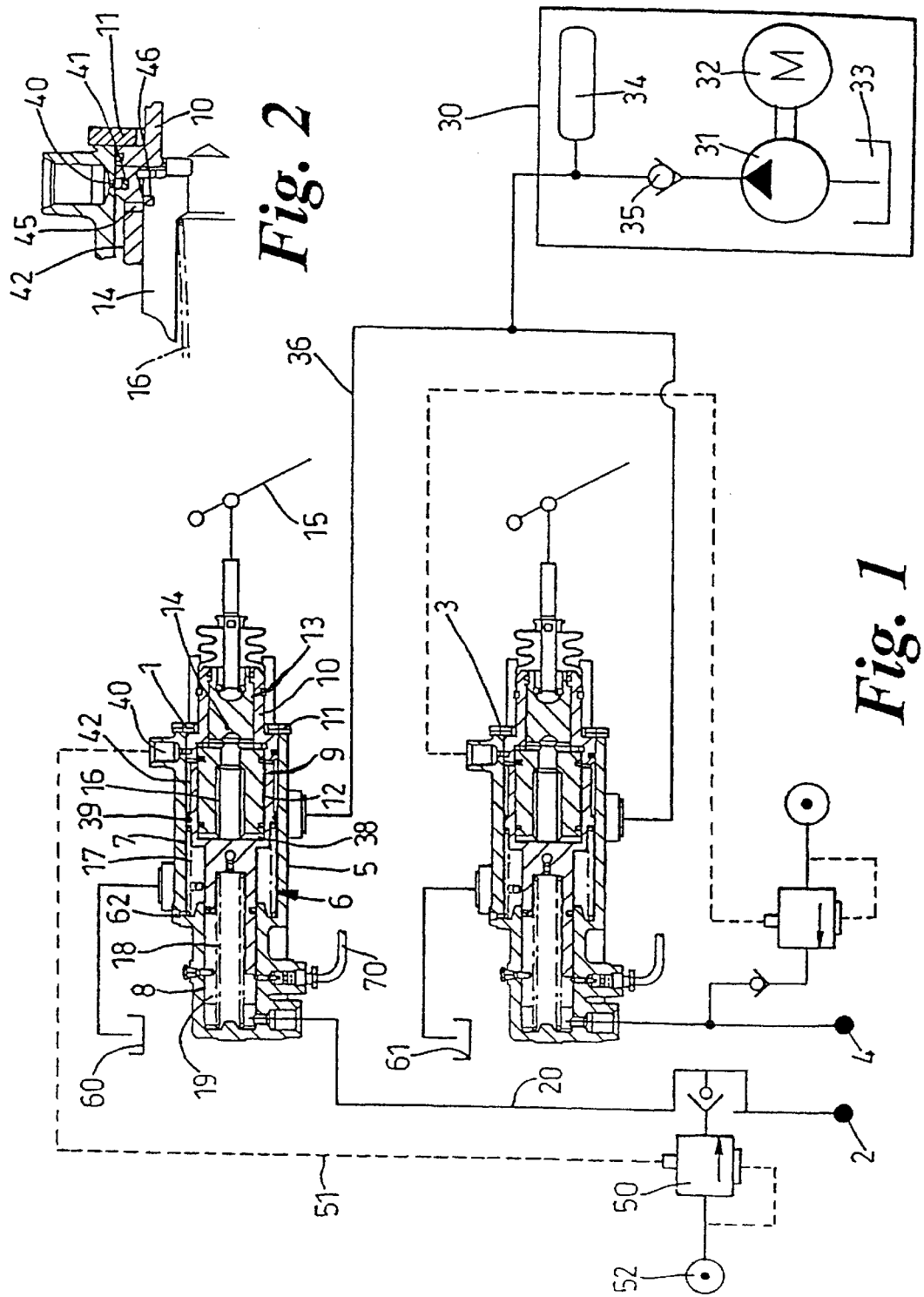

HYDRAULIC BRAKING SYSTEMS FOR VEHICLES

BACKGROUND OF THE INVENTION

This invention relates to hydraulic braking systems for vehicles of the kind in which a pedal-operated booster-assisted hydraulic master cylinder assembly is adapted to apply a vehicle brake by the supply of hydraulic fluid under pressure to a brake actuator for operating the brake.

In braking systems, particularly for vehicles of the "off-highway type", such as tractors and earth moving equipment, the trend is to adopt large running clearances between the braking members of the brake, for example between friction members and rotatable discs, in order that friction loses arising from parasitic drag are reduced or substantially eliminated.

We are aware of GB-A-2179715 which forms the pre-characterising portion of claims 1 and 8.

SUMMARY OF THE INVENTION

According to our invention in an hydraulic braking system of the kind set forth for vehicles, a proportional valve is arranged to provide a quick-fill function for a wheel brake actuator in response to a proportional pilot signal from the master cylinder assembly, and the booster includes first and second pistons which are relatively moveable to close a port leading to a reservoir and to open a proportional pressure port through which the pilot signal comprising hydraulic pressure generated in the space between the pistons by relative movement therebetween is directed to and opens the proportional valve.

The quick-fill function compensates for additional fluid volume requirements, and ensures that the pedal is immediately responsive with such additional volume requirements.

The proportional valve may be situated in any convenient location, for example in close proximity to the brake actuator.

In one construction, in a normal operative mode, the booster is adapted to meter input pressure to provide a booster signal, with the metered side of the booster being connected into and at a pressure, substantially equal to the pilot signal of the proportional valve.

As the pilot signal is applied to the proportional valve, the proportional valve will open, allowing hydraulic fluid to flow from available vehicle hydraulics into the brake actuator.

The "quick-fill" function works until a pre-set pressure is reached, directly proportional to the pilot signal provided by the booster which is also directly proportional to the effort applied by the pedal.

Preferably the setting of the proportional valve is such that all clearances are taken up by utilising available vehicle hydraulics and thereafter the proportional valve is adapted to close allowing all further braking to be applied directly from the master cylinder.

The invention allows rationalisation of boosters into fewer sizes to meet customer requirements. By tuning the proportional valve or pre-setting the setting of the proportional valve, the clearances of the brake may be taken up accordingly, and higher pressure brake stiffnesses may be applied through one size of master cylinder for all applications.

The invention is particularly applicable to a dual braking system in which brakes on wheels on opposite sides of the vehicle may be operated simultaneously for braking, or independently to assist steering. When operated simultaneously pressure spaces in the two master cylinder assemblies are interconnected to compensate for differential wear of linings of the brakes.

BRIEF DESCRIPTION OF THE DRAWINGS

One embodiment of our invention is illustrated in the accompany drawings in which:

FIG.1 is a layout of a dual hydraulic braking system for "off-highway" vehicles;

FIG. 2 is an exploded view of a proportional pressure port incorporated in each of a pair of pedal-operated booster hydraulic master cylinder assemblies.

DETAILED DESCRIPTION OF THE PREFERRED EMBODIMENTS

Figure 3:
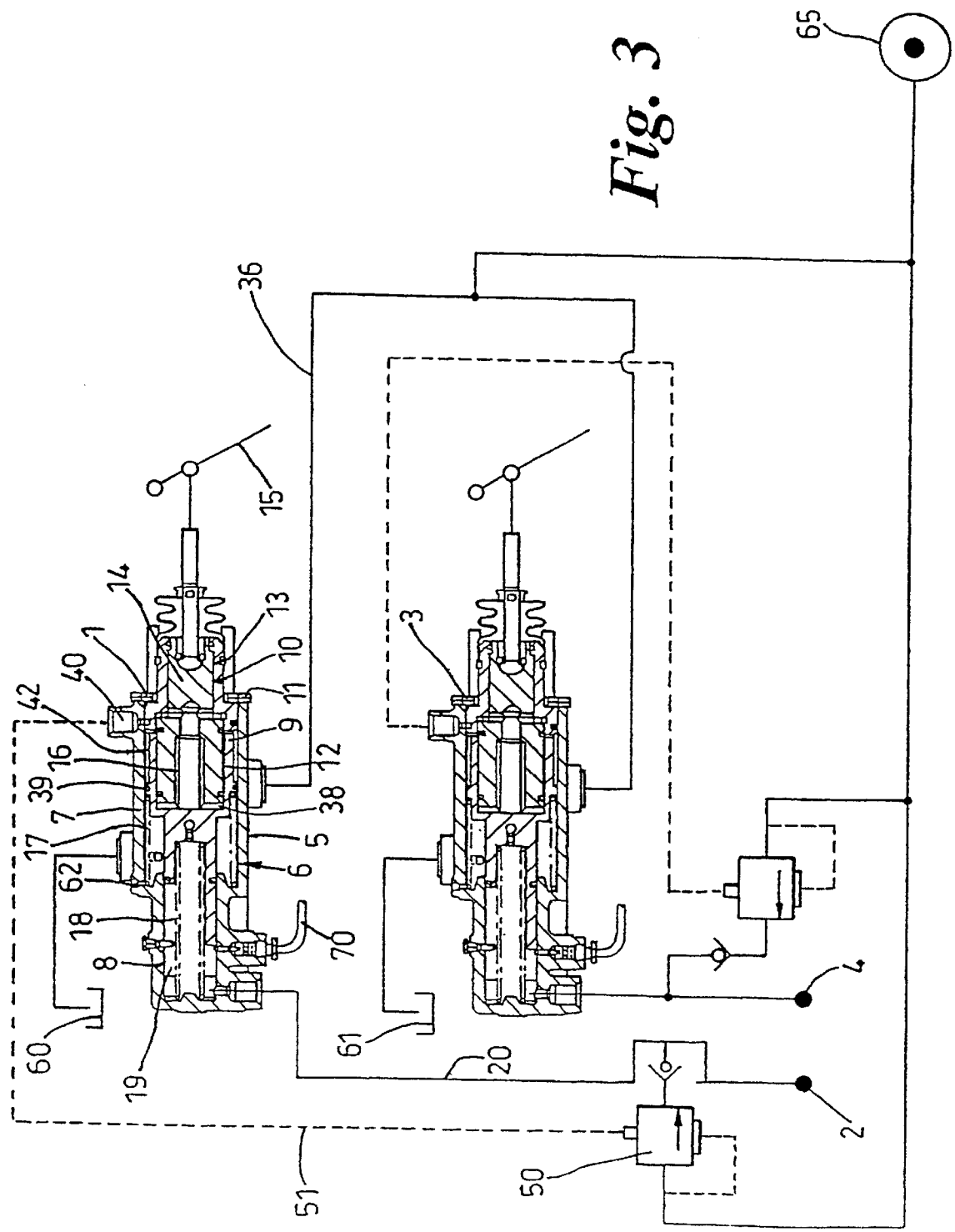
FIG. 3 is a layout similar to FIG. 1 but showing a modification.

In the braking system illustrated in the layout of FIGS. 1 and 2, a pedal-operated booster assisted hydraulic master cylinder assembly 1 is adapted to operate a brake actuator 2 in order to apply a brake on the right-hand side of a vehicle, and a similar pedal-operated booster assisted master-cylinder assembly 3 is adapted to operate a brake actuator 4 in order to apply a brake on a wheel on the opposite side of the vehicle. The two master cylinder assemblies are identical so that only the assembly 1 will be described in detail.

The pedal-operated booster assisted hydraulic master cylinder assembly 1 comprises a housing 5 having a stepped longitudinal bore 6 which is closed at its inner end and which comprises an outer bore portion 7 of greater diameter and an inner bore portion 8 of smaller diameter. A first stepped piston 9 works in the bore 6. A closure member 10 of "top-hat" section closes the outer end of the bore portion 7 and is disposed between the piston 9 and a stop defined by a mounting bracket 11. An internal bore 12 in the piston 9 and an internal bore 13 in the closure member 10, and which is of smaller diameter than the bore 12 together constitute a stepped bore in which works a second stepped piston 14 upon which a brake pedal 15 acts through an operating rod. Normally the piston 14 is held in a retracted position in which a shoulder at the step in diameter co-operates with the closure member 10 in turn to hold it in engagement with the stop 11 as biased by the loading in an internal return spring 16. Similarly a compression spring 17 acts on the piston 9 to hold it in a retracted position in engagement with the piston 13, the spring 17 being stronger than the spring 16. A third compression return spring 18 housed in a pressure space 19 defined by the bore portion 8 which is of smaller diameter also acts on the piston 9. The pressure space 19 is connected to the brake 2 through a pipe line 20.

The system is provided with a source 30 of high pressure fluid comprising a pump 31 driven by a motor 32 and which is adapted to draw hydraulic fluid from a reservoir 33 to charge an hydraulic accumulator 34 through a one-way valve 35. An outlet from the supply 30 is connected through a pipeline 36 to the master cylinder 1 through an inlet port and which, in the off position shown in the drawings, is isolated from a pressure space 38, in which the spring 16 is located, by a seal 39 carried by the piston 9.

A proportional pressure port 40 in the wall of the housing 5 is normally closed by a seal 41, also carried by the piston 9, and an annular chamber 42 defined between the bore 6 and two seals 39 and 41 communicates with a space between the pistons 14 and the bore 12 through a radial port 45. In the retracted position shown in the drawings free communication is allowed through the port 45 and past a seal 46 carried by the piston 14.

The proportional port 40 is connected to a proportional valve 50 through a pipe-line 51 and the proportional valve 50 is located in close proximity to the brake actuator 2. Normally the proportional valve 50 is closed to isolate the brake actuator 2 from vehicle hydraulics 52.

In the retracted, inoperative, position illustrated in the drawings the components of the master cylinders 1,3 are at rest with all the chambers of the master cylinders connected to respective reservoirs 60 and 61 of hydraulic fluid and which, in turn, are connected to their respective pressure spaces 19 through recuperation ports 62, and to the proportional valves 50 through the respective ports 45. The high pressure source 30 is isolated from the master cylinders 1,3 by closure of inlet ports, and the proportional pressure ports 40 are also closed.

When a master cylinder, say the master cylinder 1, is operated by the pedal the stepped pistons 14 and 9 are advanced so that fluid under pressure enters the space 42 and into the proportional pressure port 40, in turn to pressurise the pressure space 38. The piston 9 is then advanced to pressurise fluid in the pressure space 19 which, in turn, is supplied to the brake actuator 2. During this movement of the pistons 9, 14 relative movement between them also takes place, the proportional pressure port 40 is opened, and the port 45 is closed by the seal 46. A proportional pilot signal comprising hydraulic pressure in the space between the pistons 9 and 14 is therefore directed to the respective proportional valve 50 which then opens to allow hydraulic fluid to "quick-fill" into the brake actuator 2.

The "quick-fill" aspect works until a pre-set pressure is reached, directly proportional to the pilot signal provided by the master cylinder 1 and which is also directly proportional the effort provided by the pedal 15.

The setting of the proportional valve 50 is also such that all clearances are taken up utilising the available vehicle hydraulics. Thereafter the proportional valve closes allowing further braking to be applied directly from pressurised fluid supplied to the brake actuator 2 from the pressure space 19.

The pre-set pressure is tailored to the requirements of the vehicle braking system.

When braking is no longer required the pedal is released and returns to the position illustrated in the drawings, and hydraulic fluid is returned to the reservoir 60 through the recuperation port 62 in the wall of the housing 5.

Since the construction and the operation of the master cylinder 3 is similar to that of the master cylinder assembly 1 any further description is considered unnecessary.

When both master cylinder assemblies 1 and 3 are operated simultaneously to apply brakes on opposite side of the vehicle, respective pressure spaces 19 are interconnected by a valve controlled compensating passage 70 which is in open communication when both pedals are operated together. This compensates for differential wear of the linings of the two brakes.

In the braking system illustrated in the layout of FIG. 3 of the accompanying drawings the source 30 is omitted, and the volume of hydraulic fluid from the vehicle hydraulics 65 is utilised to provide the quick-fill function described above.

The construction and operation of the system illustrated in the layout of FIG. 3 is otherwise the same as that of FIG. 1 and corresponding reference numerals have been applied to corresponding parts.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A hydraulic braking system for a vehicle having a hydraulic master cylinder assembly adapted to apply a vehicle brake by supplying hydraulic fluid under pressure to a brake actuator, the system comprising:
   a proportional valve operatively coupled to the brake actuator; and
   a booster operatively coupled to the proportional valve, the booster having
      a port leading to a hydraulic fluid reservoir,
      a first piston and a second piston, said first and second pistons being relatively movable to close the port, and
      a proportional pressure port through which a proportional pilot signal from the master cylinder assembly is directed, wherein the proportional pilot signal corresponds to hydraulic pressure generated in a space between said first and second pistons by relative movement therebetween, and wherein said proportional pressure port opens from the relative movement of the first piston and the second piston to open said proportional valve in response to the proportional pilot signal to allow the hydraulic fluid to quick fill into the brake actuator.

2. The braking system as recited in claim 1 wherein said booster meters input pressure to provide a booster signal, with a metered side of said booster being connected into and at a pressure substantially equal to the hydraulic pressure corresponding to the proportional pilot signal of said proportional valve so that as the proportional pilot signal is applied to said proportional valve, said proportional valve opens to allow hydraulic fluid to flow into said brake actuator.

3. The braking system as recited in claim 1 wherein the quick-fill function operates until a pre-set pressure is reached, wherein the pre-set pressure is directly proportional to the proportional pilot signal.

4. The braking system as recited in claim 1, wherein a setting of said proportional valve is such that braking clearances between said first and second pistons are taken up by utilizing available hydraulic fluid and thereafter said proportional valve is adapted to close, allowing all further braking to be applied directly from said master cylinder assembly.

5. A dual hydraulic braking system comprising:
   a first and a second hydraulic master cylinder assembly, each master cylinder assembly including a pressure space for connection to a brake;
   a valve controlled compensating passage interconnecting pressure spaces in the first and the second master cylinder assembly;
   a first proportional valve operatively coupled to a first wheel brake actuator associated with the first master cylinder assembly and a second proportional valve operatively coupled to a second wheel brake actuator associated with the second master cylinder assembly; and a first booster operatively coupled to the first proportional valve and a second booster operatively coupled to the second proportional valve, the first and second boosters each having a port leading to a hydraulic fluid reservoir, a first piston and a second piston, said first and second pistons being relatively movable to close the port, and a proportional pressure port through which a proportional pilot signal from one of the first and second master cylinder assemblies is directed, wherein the proportional pilot signal corresponds to hydraulic pressure in a space between said first and second pistons, and wherein said proportional pressure port opens from relative movement of the first piston and the second piston to open one of said first and second proportional valves in response to the proportional pilot signal to allow the hydraulic fluid to quick fill into one of the first and second wheel brake actuators.

6. The braking system as recited in claim 5 wherein one of said first and second booster meters input pressure to provide a booster signal, with a metered side of said booster being connected into and at a pressure substantially equal to the hydraulic pressure corresponding to the proportional pilot signal of one of said first and second proportional valves so that as the proportional pilot signal is applied to one of first and second said proportional valves, said one of said first and second proportional valves opening to allow hydraulic fluid to flow into one of said first and second brake actuators.

7. The braking system as recited in claim 5 wherein the quick-fill function operates until a pre-set pressure is reached, wherein the pre-set pressure is directly proportional to the proportional pilot signal.

8. The braking system as recited in claim 5, wherein a setting of one of first and second said proportional valves is such that braking clearances between said first and second pistons are taken up by utilizing available hydraulic fluid and thereafter said one of said first and second proportional valves is adapted to close, allowing all further braking to be applied directly from said master cylinder assembly.

* * * * *